Nov. 6, 1923.
C. M. KRUGER
BUNG
Filed March 23, 1922
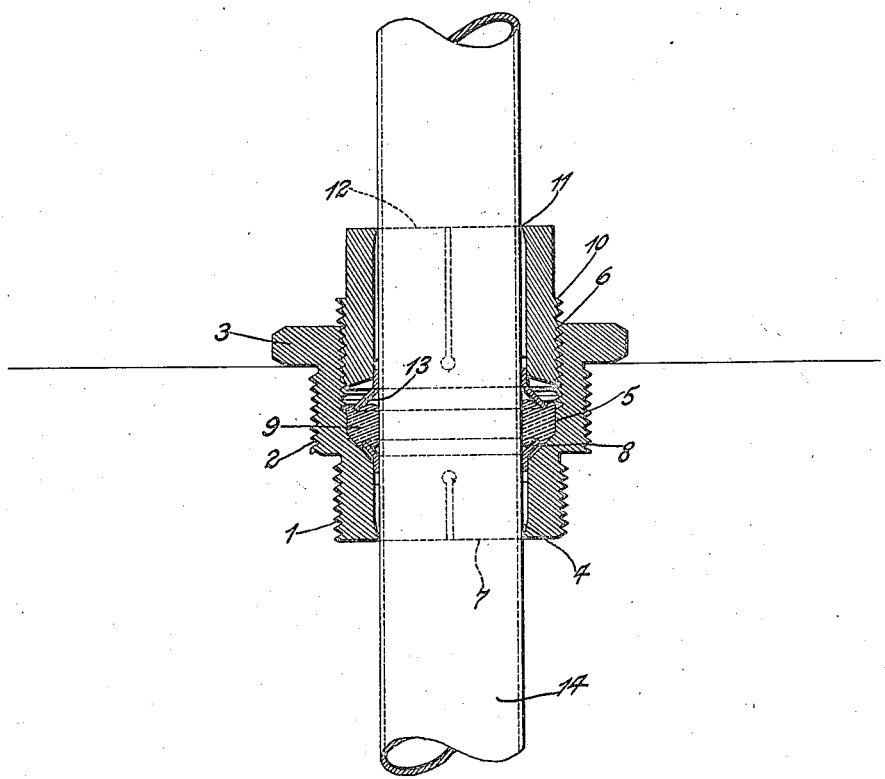
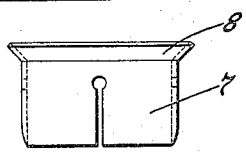
Inventor.
Charles M. Kruger,
by Rippey & Kingsland,
His Attorneys.

Patented Nov. 6, 1923.

1,473,300

UNITED STATES PATENT OFFICE.

CHARLES M. KRUGER, OF ST. LOUIS, MISSOURI, ASSIGNOR TO PARBEE MANUFACTURING COMPANY, OF ST. LOUIS, MISSOURI, A CORPORATION OF MISSOURI.

BUNG.

Application filed March 23, 1922. Serial No. 546,112.

*To all whom it may concern:*

Be it known that I, CHARLES M. KRUGER, a citizen of the United States, residing at St. Louis, Missouri, have invented a new and useful Bung, of which the following is a specification.

This invention relates to improvements in bungs, and consists in the novel construction hereinafter disclosed.

An object of the invention is to provide a bung for a container through which a stand-pipe extends, said bung being so constructed as to form a perfect seal between the pipe and the bung preventing egress or ingress of liquid surrounding the stand-pipe.

Additional advantages of the construction will be apparent from the following detailed description thereof taken in connection with the accompanying drawing, in which—

Fig. 1 is a vertical section of the bung showing the stand-pipe in full lines.

Fig. 2 is a detailed view of the sleeve forming a part of the bung construction.

In the embodiment of the invention illustrated in the drawing a bushing, comprising stepped threaded sections 1 and 2 and a polygonal flange 3, is provided for insertion in a threaded bung hole of a container, the bushing being screwed into the threaded bung portion and engaging the polygonal flange 3. The interior opening of the bushing has a lower tapering section 4 and an enlarged channel 5 which form a seat for the packing, and an upper internally threaded section 6.

A split sleeve 7 having an outwardly flaring flange 8 is seated in the lower tapering section 4 of the bushing, and a ring of packing material 9 is inserted in the channel or seat 5.

An exteriorly threaded sleeve 10 having a tapering opening 11 threads into the section 6 of the bushing. The upper part of the sleeve 10 is polygonal so as to provide for the engagement therewith of a wrench so that it may be screwed downwardly into the bushing. A split sleeve 12, similar to the split sleeve 7 except that the same is slightly longer, is seated within the tapering opening of the sleeve 10. The split sleeve 12 has an outwardly flaring flange 13.

The stand-pipe 14 is inserted through the sleeves 7 and 12 and the sleeve 10 then is turned into the bushing, resulting in the drawing together of the sleeve and bushing, forcing the split or resilient sleeves 7 and 12 inwardly for close engagement with the stand-pipe, and also drawing the flanges 8 and 13 of the split sleeves 7 and 12 respectively, into the surface of the elastic packing ring 9. The above action forces the packing ring inwardly in tight contact with the wall of the stand pipe.

The bung is particularly adapted for mounting the stand-pipe of a pump structure in any liquid container, such as oil barrels or the like, and is effective for preventing the contents of the container from passing outwardly, and also for preventing any liquid accumulation on the exterior portion of the stand-pipe from finding its way into the container. Thus, a container equipped with the construction may be exposed to weather without danger of moisture entering the container.

I am aware that the invention may be modifier in certain particulars without departing from the spirit and scope thereof. I do not limit myself unessentially, but what I claim and desire to secure by Letters Patent, is:—

1. A bung, comprising a bushing having an upwardly tapering opening, an enlarged section above said tapering opening, and a threaded upper portion; a split sleeve having an outwardly flaring flange seated in said tapering portion; a threaded sleeve adapted to thread into said threaded portion of the bushing, said sleeve having a downwardly tapering opening; a split sleeve mounted in said tapering opening, said split sleeve having an outwardly flaring flange at its lower end; and a packing ring of elastic material interposed between the inner ends of said split sleeves.

2. A bung, comprising a bushing having an exteriorly threaded portion adapted to thread into the bung opening of a container; a polygonal flange for wrench engagement; the opening of said bushing having a tapering lower portion, an enlarged channel and an upper threaded portion; a resilient sleeve mounted in said bushing, said sleeve having an outwardly flaring flange at its upper end; a sleeve having a threaded portion adapted to thread into the threaded portion of the bushing, and a polygonal portion for wrench engagement; the interior surface of said sleeve being tapering; a resilient split sleeve having an outwardly flaring flange at its lower end mounted in said last-named sleeve; and packing material disposed within the bushing intermediate the flanges of said split sleeves.

3. The combination of a pipe, resilient sleeves mounted on said pipe in spaced relationship, said sleeves having outwardly flaring flanges at their adjacent ends, packing material between the adjacent ends of said sleeves, and an interfitting bushing and sleeve fitting over said first-named resilient sleeves, said bushing and sleeve being arranged to thread together to imbed the flanges of the resilient sleeves in the packing material and to clamp said sleeve and said packing material about said pipe.

4. A bung, comprising a bushing member, a sleeve mounted within the bushing member, a threaded sleeve threading into the bore of the bushing member, a split sleeve within said threaded sleeve, and packing material between the ends of said split sleeves so arranged as to receive the ends of said split sleeves in imbedded engagement when said threaded sleeve is screwed into the bore of said bushing, said split sleeves being arranged to move the packing material inwardly against a pipe when said threaded sleeve is so screwed into said bushing.

CHARLES M. KRUGER.